N. G. LAWSON.
BEET HARVESTER.
APPLICATION FILED JULY 6, 1911.

1,031,189.

Patented July 2, 1912.

2 SHEETS—SHEET 2.

Witnesses

N. G. Lawson
Inventor by C. A. Snow & Co.
Attorneys

UNITED STATES PATENT OFFICE.

NELSON G. LAWSON, OF DENVER, COLORADO.

BEET-HARVESTER.

1,031,189.  Specification of Letters Patent.  Patented July 2, 1912.

Original application filed April 28, 1911, Serial No. 623,910. Divided and this application filed July 6, 1911. Serial No. 637,088.

*To all whom it may concern:*

Be it known that I, NELSON G. LAWSON, a citizen of the United States, residing at Denver, in the city and county of Denver and State of Colorado, have invented a new and useful Beet-Harvester, of which the following is a specification.

This invention relates to improvements in beet harvesters, the primary object of the invention being the provision of a machine adapted to dig the beets after their tops have been removed, in combination with means whereby the digging wheels are placed into and out of engagement with the ground or at various adjustments therebetween by means of a pair of swingingly mounted supporting wheels and means for regulating said wheels and retaining them in the desired adjustment, the present application being a divisional application of an application for beet topper and harvester filed April 28, 1911, Serial No. 623,910.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

Figure 1:
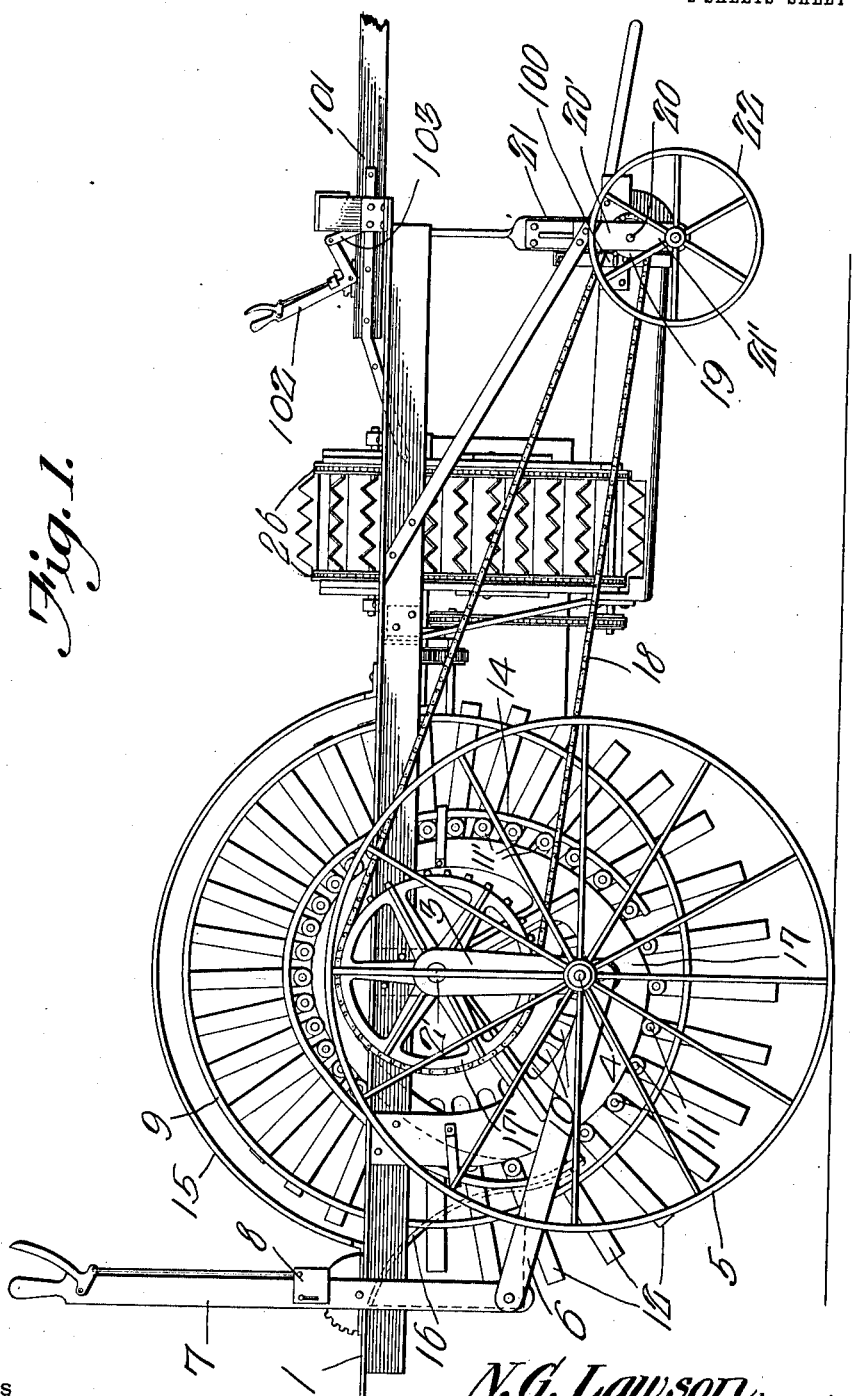
Figure 2:
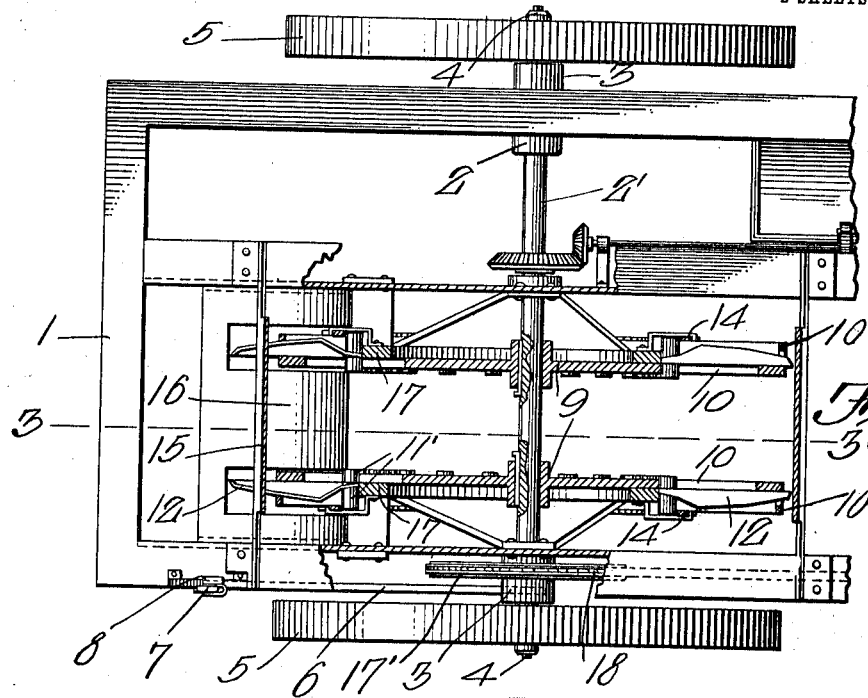
Figure 3:
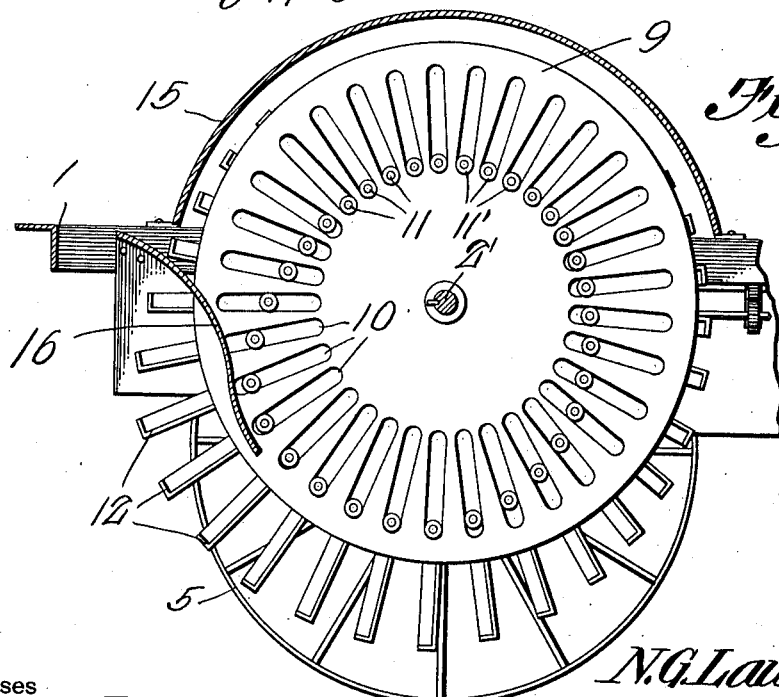

In the drawings Figure 1 is a side elevation of a complete machine. Fig. 2 is a top plan view, partly in section of the digger wheels and the adjacent parts. Fig. 3 is a section taken on line 3—3 of Fig. 2.

Referring to the drawings, the numeral 1 designates the main frame of the machine, which is provided with journals 2, in which is mounted the shaft or axle 2'. Swingingly connected to the extreme ends of this shaft or axle 2', are two depending arms 3, which carry at their lower ends the stub axles 4 and the main wheels 5, the link 6 being connected to the arms 3 and through the medium of the lever 7, and the lever and ratchet mechanism 8, said crank arm 3 may be moved to change the relative position of the wheels 5 to the frame 1. Keyed upon the shaft 2' and rotatable therewith are the two wheels or disks 9, which are provided with radiating slots 10 in which are slidably mounted the pins 11 which carry the beet digger points or teeth 12. Each disk has an inwardly projecting tread forming an earth engaging rim 10; through which said teeth slidably project.

The stationary cams 17 are so connected to and supported by the frame 1, that the outer face of each is always engaged by the rollers 11', journaled upon the pins 11 of the diggers 12, and by this means as the disks or wheels 9 are rotated, the said diggers are projected and retracted according as they pass around said cams 17. Parallel with the forward top and rear portions of the cam surface of the cams 17, are the cam guide strips 14, which abut the outer surfaces of the rollers 11', and retain the same in contact with the cam surface of the cams 17. By this means as the vehicle is drawn over the ground, the diggers 12 are projected as they move toward the forward ends of the machine, their final, or farthest points of projection being when they are directly below the axle 2', after which they begin to retract and carry the beets upwardly until the said beets strike the separating arm 16, this arm 16 projecting between the two sets of diggers 12 and preventing the beets from being carried farther up by said diggers and against the guard 15.

Mounted rotatably with the shaft 2' and upon the right hand side thereof is a large grooved or sprocket wheel 17', which transmits motion through the belt or chain 18 to the small sprocket or grooved wheel 19 journaled at the front of the machine. This sprocket 19, or pulley wheel, is mounted upon the shaft 20 which is journaled in the adjustable support 20' carried by the forward frame 21 of this machine. Mounted in the lower depending arms 21' of the forward frame are the two front wheels 22, these wheels being for the purpose of carrying and regulating the height of the top cutter 100.

Provided at the forward end of the machine is a tongue 101, which by means of the lever 102 and its connection 103 may be raised or lowered as desired.

By providing the digger disks 10, with the rims 10', the disks are limited in their earth engagement, as the tread of said rims is of a sufficient width to support the disks upon the earth and permit the full projection of the teeth into the earth to dig the beets.

The teeth are so constructed, that as they are projected, their beet engaging terminals are moved or inclined inwardly so that the radially alined teeth of the two disks will coöperate in pairs to engage the beets upon opposite sides and pull them from the earth.

By this construction it will be seen that the simple manipulation of the lever at the rear of the machine will swing the axle and at the same time move the main supporting wheels in an arc of a circle with the axle as the center, so as to permit the frame of the machine to be lowered or raised with relation to the ground thereby regulating the depth at which the diggers are to pierce the ground.

It will thus be seen that the operation of the digging is entirely regulated by the manipulation of the swinging frame carrying the main wheels, and that it is so constructed that when in position as shown in full lines in Fig. 1, the machine may be transported without the digging disks engaging the ground, but should it be desired to operate the same to dig beets, the lever is manipulated or pulled rearwardly and locked to assume the various desired positions, and at the same time permit the digging disks to be brought into engagement with the ground.

From the foregoing description, taken in connection with the drawings it is evident that the lever 7 may be operated to raise the wheels 5 entirely from the ground so that the diggers 12 and their respective carrying wheels may rest upon the ground and act as a rolling support for the machine, as the machine is drawn by either a traction engine or horse power. The wheels 5 may also be adjusted so as to rest upon the ground to carry the machine or to limit the depth at which the diggers 12 will enter the ground to gather the beets. This of course being regulated with relation to the character of the soil and also with the depth of the beets within the ground. As the machine is pulled over the surface the friction of the diggers with the ground will cause the said main shaft 2' to be rotated and through this medium the top cutting mechanism 100 is operated as is also the endless belt 26 which will deliver the cut tops into a hopper, this construction being the subject matter of the said application of which this application is a division.

What is claimed is:

1. A beet harvester, having a frame, a shaft rotatably mounted therein, a pair of digger disks carried by and rotatable with said shaft, said digger disks being provided with a series of radial slots, a series of digger teeth mounted in said slots, two cams, one to each digger disk connected to and supported by the frame and in fixed relation to the disks, and means carried by the teeth of the disks operably disposed with relation to the cam, whereby the rotation of the disks will project and retract the digger teeth.

2. A beet harvester, having a frame, a shaft rotatably mounted therein, a pair of digger disks mounted upon and rotatable with said shaft, said digger disks being provided with a series of radial slots, a digger tooth, one to each slot of the respective disks slidably mounted therein to be projected beyond and retracted within the periphery of its respective disk, two stationary cams connected to and carried by the frame, one to each digger disk, a cam strip co-acting with each cam and surrounding the greater and upper portion thereof, and also supported by the frame, and means carried by each digger tooth for co-action with the cam and cam strips, whereby when the disks are rotated the teeth are projected and retracted.

3. A beet harvester, having a main frame, a shaft rotatably mounted therein, a pair of digger disks fixedly connected to and rotatable with said shaft, each disk having an earth engaging rim, a series of digger teeth slidably carried in said disks and disposed to be projected beyond and retracted within said rim, and co-acting means carried by said teeth and the main frame for imparting such movement to the teeth as the disks are rotated.

4. A beet harvester having a main frame, a shaft rotatably mounted therein, two digger disks keyed to said shaft and rotatable therewith, a series of radially disposed and slidably mounted digger teeth carried by each disk, the free end of said teeth being positioned to project inwardly at an angle toward each other when projected, a cam for each disk connected to the main frame in fixed relation to its respective disk, and means carried by the teeth for coaction with the cam to retract and project the teeth due to the rotation of the disks.

5. A beet harvester, having a main frame, a shaft rotatably mounted therein, a pair of digger disks keyed to and rotatable with said shaft, a series of digger teeth slidably mounted and radially supported in each digger disk to be projected and retracted as the teeth engage and move from the ground, a coacting stationary cam and cam strip connected to the frame, one set to each digger disk, and means carried by each tooth for coaction with its cam and cam strip during the rotation of the digger disks to project and retract the said teeth.

6. A beet harvester, having a main shaft rotatably mounted therein, a pair of digger disks provided each with a peripheral flange forming a tread, a series of digging teeth radially slidable in each disk, a curved plate disposed between said disks at the rear thereof for removing the beets lifted by the teeth, a pin projecting from the inner end of each tooth, a cam connected to the frame rigidly with respect to its digger disks, one cam to each disk, said cam being positioned to be engaged by the respective pins of the teeth, and a cam strip surrounding the greater and upper portion of each cam and fixed to the frame, said strips coacting with the cams to guide the pins of the teeth, said cam and strip of each digger disk being positioned to retract and project the respective teeth.

In testimony that I claim the foregoing as my own, I have hereto affixed my signature in the presence of two witnesses.

NELSON G. LAWSON.

Witnesses:
ALLYN COLE,
MAITLAND MILLIKEN.

Copies of this patent may be obtained for five cents each, by addressing the "Commissioner of Patents, Washington, D. C."